2,705,694
Patented Apr. 5, 1955

2,705,694
INSECTICIDAL COMPOSITIONS COMPRISING DIETHYL THIOPHOSPHORIC ACID DISULFIDE

Jeffrey H. Bartlett, Westfield, Harry W. Rudel, Roselle Park, and Elmer B. Cyphers, Cranford, N. J., assignors to Esso Research and Engineering Company, a corporation of Delaware No Drawing. Application June 24, 1952, Serial No. 295,358

5 Claims. (Cl. 167—22)

This invention relates to new and useful improvements in parasiticidal preparations and more particularly to improved insecticides. This invention also relates to methods of protecting organic material subject to attack by low orders of organisms. More specifically, this invention is concerned with insecticidal compositions containing as the active ingredient diethyl thiophosphoric acid disulfide.

This application is a continuation-in-part of U. S. Patent No. 2,611,729, issued September 23, 1952.

It has now been found that diethyl thiophosphoric acid disulfide is extremely effective for checking the growth of insects. This compound is thus used as the novel ingredient of insecticidal compositions. The formula of diethyl thiophosphoric acid disulfide is as indicated below:

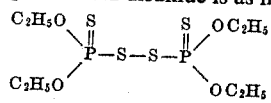

It is especially surprising to find that diethyl thiophosphoric acid disulfide shows extremely good insecticidal activity in view of the fact that many closely related phosphoric acid derivatives show distinctly inferior insecticidal activity as compared to the compound of this invention.

Diethyl thiophosphoric acid disulfide may be prepared in general by the manner of U. S. Patent No. 2,523,146 issued September 19, 1950, i. e., by converting diethyl thiophosphoric acid into a water-soluble salt, dissolving this salt and a water-soluble metal nitrite in water, and adding a mineral acid to liberate the nitrous acid in solution. The acid not only liberates the nitrous acid, but converts the salt into a free acid of phosphorus and the disulfide reaction product is precipitated as an oil from the aqueous medium.

The following examples are given to illustrate this invention and include both the preparation of diethyl thiophosphoric acid disulfide and test results obtained on its use as an insecticide.

Example I.—Preparation of diethyl thiophosphoric acid disulfide

A flask equipped with a stirrer, reflux condenser, and thermometer was charged with 276 grams of absolute ethanol and 333 grams of P$_2$S$_5$. The reaction was exothermic and the temperature rose to 70° C. within fifteen minutes. After heating externally for an additional twenty minutes at 80° C., the product was filtered to remove a small amount of insoluble material. 400 grams of the diethyl thiophosphoric acid thus prepared was neutralized with a solution of 86 grams of sodium hydroxide dissolved in 350 cc. of water, employing external cooling during the reaction to maintain the temperature below 40° C. The sodium salt was completely soluble in the aqueous solution. 156 grams of sodium nitrite was then added portionwise to the aqueous solution with stirring.

A solution of 230 grams of concentrated sulfuric acid diluted with 108 grams of water was then added to the above solution, dropwise with stirring. The reaction mixture was cooled externally during the addition of the acid, maintaining the temperature below 40° C. The diethyl thiophosphoric acid disulfide thus formed separated as an insoluble oil. The oil was isolated, washed once with water, once with 5% sodium hydroxide and three times with water. The product was then dried by blowing with nitrogen at 105° C. The resulting material gave the following analysis:

|  | Found | Theory |
| --- | --- | --- |
| Phosphorus | 16.83 | 16.77 |
| Sulfur | 34.27 | 34.60 |

Example II.—Insecticidal test results with diethyl thiophosphoric acid disulfide Diethyl thiophosphoric acid disulfide was tested for insecticidal activity. The values given in column I of the following table represent the percentage mortality of the test insects after 96 hours following a two-minute immersion in an 0.25% aqueous solution or suspension of the test compound.

The results in column II are given as per cent mortality of the test insect after 96 hours following bloodstream injection of the indicated dosages of the test compound.

The figures in column III list the results obtained on the Nelson drop test for house-fly toxicity. At full dosage (D), 5 mg. of test material/gm. body weight is placed on the fly's body (0.002 cc. of a 5% solution per fly).

| Compound | Insecticidal Activity | | | | | | |
| --- | --- | --- | --- | --- | --- | --- | --- |
|  | I | | II | | | III | |
|  | Contact Insecticidal Activity, % Kill | | Bloodstream Insecticidal Activity, % Kill | | | House-Fly Toxicity Nelson Drop Test | |
|  | Blatella germanica (German Roach) | Omelpeltus sociatus (MilkWeed Bug) | Periplanitus americana (American Roach) | | | Male/ Female | Male/ Female |
|  | | | | Female | Male | | |
|  | Male | Fem. | 0.5 mg. | 0.5 mg. | 0.1 mg. | D | D/2.5 |
| Diethylthiophosphoric acid disulfide | 100 | 100 | 100 | 40 | 100 | 100 | 100/100 | 100/100 |
| Triethyl phosphate | 50 | 0 | 30 | 20 | 100 | 60 | 70/0 | 0/20 |
| Tricresyl phosphate | 40 | 20 | 0 | 20 | 100 | 100 | 0/10 | 0/10 |

These figures indicate that diethyl thiophosphoric acid disulfide is a surprisingly effective contact insecticide, being far superior to the related compounds on Blatella germanica (German roach), Omelpeltus sociatus (milk weed bug), and the house fly. It will also be noted that the compound of this invention showed good activity as an ingestion insecticide in the bloodstream tests on Periplanitus americana (American roach).

The compound of this invention is best distributed in the form of sprays such as in aqueous dispersions or dust compositions of the active ingredient with a powdered clay.

Since the compound of this invention is a water insoluble oil, it is preferable to use it admixed with wetting or emulsifying agents so as to be able to secure aqueous emulsions and consequent uniformity of dispersion in the resulting colloidal system. The use of these wetting agents also increases the spreading action of the spray by decreasing the surface tension of the liquid carrier. This results in the securing of better contact of the spray with the surface being treated, and consequently brings the active ingredient into intimate contact with the parasite life. The concentration of active ingredient in the aqueous emulsions varies with the insect pests to be treated. In general, the aqueous emulsion contains about 5% active ingredient, and 1% wetting agent by weight. Thus, a typical emulsion concentrate formulation consists of 83% diethyl thiophosphoric acid disulfide and 17% petroleum sulfonate salt by weight on an active ingredient basis. This mixture can then be diluted with about 94 parts of water to 6 parts of concentrate.

The active compound of this invention can also desirably be made up in solid compositions. A dust composition containing about 5% active ingredient is made up by admixing the active compound with clays such as fuller's earth, china clay, kaolin, or bentonite. Solid wettable powders for aqueous dispersion contain about 25–50% active ingredient, 50–75% clay, and about 1% wetting agent. Clay itself also acts as a spreading agent.

The term "emulsifying agent" is consequently used hereafter to connote generically, the various "emulsifying agents," 'wetting agents" and "spreading agents" including clays that are adapted to be admixed with the active compound of this invention in order to secure better wetting and spreading of the sprays of the active ingredients in the liquid vehicles in which they are insoluble through the lowering of the surface tension of the vehicles (see Frear—"Chemistry of Insecticides, Fungicides, and Herbicides," second edition, page 280).

Among the water-soluble wetting agents that can be used are the sulfates of long-chain alcohols such as dodecanol up to octadecanol, sulfonated amide and ester derivatives, sulfonated aromatic and mixed alkyl-aryl sulfonate derivatives, esters of fatty acids such as the ricinoleic acid ester of sorbitol, and salts of the petroleum sulfonic acids known as mahogany acids. Alkali metal salts of the latter are preferred. The non-ionic emulsifying agents such as the ethylene oxide condensation products of alkylated phenols, alcohols or amines may also be used.

Solvents for the compound of this invention may be utilized as auxiliary agents if desired. Among the solvents for the compound of this invention are petroleum fractions such as kerosene, aromatic solvents such as toluene or xylene, and chlorinated hydrocarbons such as carbon tetrachloride or trichloroethylene.

The compound of this invention may also be admixed with carriers that are themselves active, such as other parasiticides, hormones, herbicides, fertilizers, and wetting agents. Stomach and contact insecticides such as the arsenates, fluorides, rotanone, and the various fish poisons and organic insecticides, such as di(p-)chlorophenyltrichlorethane, benzene-hexachloride, and similar products may also be advantageously added.

It is to be understood that the invention is not limited to the specific examples which have been offered merely as illustrations, and that modifications may be made without departing from the spirit of the invention.

What is claimed is:

1. An insecticidal composition comprising diethyl thiophosphoric acid disulfide as the active ingredient admixed with an emulsifying agent which lowers the surface tension of water and thereby promotes aqueous emulsions of the active ingredient.

2. An insecticidal composition comprising diethyl thiophosphoric acid disulfide contained in an aqueous emulsion with an emulsifying agent.

3. An insecticidal dust composition comprising diethyl thiophosphoric acid disulfide admixed with a powdered clay.

4. A composition as in claim 3 in which the clay is bentonite.

5. An insecticidal emulsion concentrate comprising diethyl thiophosphoric acid disulfide admixed with a petroleum sulfonate salt, said petroleum sulfonate salt being present in an amount of about 1/5 by weight of the diethyl thiophosphoric acid disulfide.

References Cited in the file of this patent

UNITED STATES PATENTS

| | | |
|---|---|---|
| 1,763,852 | Johnson | June 17, 1930 |
| 2,063,629 | Salzberg | Dec. 8, 1936 |